United States Patent
Hayes et al.

(10) Patent No.: US 11,661,841 B2
(45) Date of Patent: May 30, 2023

(54) DOWNHOLE COMMUNICATION CARRIER FLUID

(71) Applicant: ConocoPhillips Company, Houston, TX (US)

(72) Inventors: Joshua C. Hayes, Houston, TX (US); Leo C. Hayes, Pagosa Springs, CO (US); Kyle R. Fontenot, Sealy, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 105 days.

(21) Appl. No.: 16/709,754

(22) Filed: Dec. 10, 2019

(65) Prior Publication Data

US 2020/0217191 A1 Jul. 9, 2020

Related U.S. Application Data

(60) Provisional application No. 62/777,513, filed on Dec. 10, 2018.

(51) Int. Cl.
  *E21B 47/13* (2012.01)
  *H04W 4/80* (2018.01)
  *C09K 8/04* (2006.01)

(52) U.S. Cl.
  CPC ............... *E21B 47/13* (2020.05); *C09K 8/04* (2013.01); *H04W 4/80* (2018.02); *C09K 2208/08* (2013.01)

(58) Field of Classification Search
  CPC ........ E21B 47/13; C09K 8/04; C09K 2208/08
  See application file for complete search history.

(56) References Cited

U.S. PATENT DOCUMENTS

| | | |
|---|---|---|
| 2,696,468 A | 12/1954 | Fischer |
| 4,770,034 A | 9/1988 | Titchener et al. |
| 6,006,831 A | 12/1999 | Schlemmer et al. |
| 6,770,603 B1 | 8/2004 | Sawdon et al. |
| 6,787,505 B1 | 9/2004 | Maitland et al. |
| 7,112,557 B2 | 9/2006 | Thaemlitz |
| 7,244,694 B2 | 7/2007 | Fu et al. |
| 7,732,381 B2 | 6/2010 | Williams et al. |
| 8,183,180 B2 | 5/2012 | Tour et al. |
| 8,469,118 B2 | 6/2013 | Passade-Boupat et al. |
| 8,763,695 B2 | 7/2014 | Van Zanten |

(Continued)

FOREIGN PATENT DOCUMENTS

| WO | 2009068363 | 6/2009 |
|---|---|---|
| WO | 20170192642 A1 | 11/2017 |

(Continued)

*Primary Examiner* — Silvana C Runyan
(74) *Attorney, Agent, or Firm* — ConocoPhillips Company

(57) ABSTRACT

An inexpensive electrically conductive carrier is added to well bore fluids thereby allowing for a closed loop real-time data communication system for topside management of all downhole equipment including drilling, completion, production, logging, and workover equipment. Conductive carrier fluid provides a "real-time" digital and analog bi-directional data and communication solution between the surface operations of a well-bore and downhole tools. Conductive carrier fluid provides for the application of more sophisticated software essential for exact control requirements of sophisticated downhole equipment, thereby achieving optimized tool performance as well as future downhole tools.

8 Claims, 2 Drawing Sheets

(56) References Cited

U.S. PATENT DOCUMENTS

| | | | |
|---|---|---|---|
| 9,243,483 B2 | 1/2016 | Keller et al. | |
| 2006/0102345 A1* | 5/2006 | McCarthy | G01V 3/30 |
| | | | 166/250.1 |
| 2011/0067864 A1* | 3/2011 | Reddy | C09K 8/467 |
| | | | 166/285 |
| 2011/0111988 A1* | 5/2011 | Ionescu Vasii | C09K 8/36 |
| | | | 507/103 |
| 2013/0032350 A1* | 2/2013 | Potapenko | E21B 43/26 |
| | | | 166/308.1 |
| 2013/0265171 A1* | 10/2013 | Hay | E21B 17/028 |
| | | | 340/854.4 |
| 2014/0184228 A1* | 7/2014 | Fu | E21B 43/267 |
| | | | 166/308.1 |
| 2014/0367091 A1 | 12/2014 | Tour et al. | |
| 2015/0284619 A1 | 10/2015 | Price et al. | |
| 2015/0368539 A1 | 12/2015 | Tour et al. | |
| 2017/0283683 A1 | 10/2017 | Sheldon et al. | |

FOREIGN PATENT DOCUMENTS

| | | |
|---|---|---|
| WO | 20170192646 A1 | 11/2017 |
| WO | 20170192652 A1 | 11/2017 |
| WO | 20170192656 A1 | 11/2017 |

* cited by examiner

Span 12.8MHz

DOWNHOLE COMMUNICATION CARRIER FLUID

CROSS-REFERENCE TO RELATED APPLICATIONS

This application is a non-provisional application which claims benefit under 35 USC § 119(e) to U.S. Provisional Application Ser. No. 62/777,513 filed Dec. 10, 2018, entitled "RIG TO BIT COMMUNICATIONS," which is incorporated herein in its entirety.

STATEMENT REGARDING FEDERALLY SPONSORED RESEARCH

None.

FIELD OF THE INVENTION

The present invention relates generally to bi-directional downhole data communication and control by utilizing a conductive additive to well-bore fluids and cement slurries, making them conductive to electromagnetic waves. This additive converts the well-bore fluids and cement slurries into a signal carrier to transmit and receive data between the rig and BHA or downhole tools. More particularly, but not by way of limitation, embodiments of the present invention include the conductivity level of the additive, which can be managed to increase or decrease conductivity levels as the bore hole conditions vary, also allowing for other unique purposes such as charging down hole battery powered sensors, and the like.

BACKGROUND OF THE INVENTION

There is a lack of real-time high-fidelity data from downhole tools to surface instruments. Methods to achieve data transmission to and from thousands of feet below the surface up to processing equipment on the surface include wired pipe, wire line, and other physical connections or mud-pulse data transmission which is limited in bandwidth and ability to transmit complex signals. Mud-pulse data rate of 8-12 bps maximum is too slow for automation and high fidelity data communication.

Currently, using existing technology you can achieve approximately 250 bps (RSS) either through Mud-pulse data or wireline date. Unfortunately, the cost using existing options technologies such as wired drill pipe can be cost prohibitive.

Existing technologies to get data to and from downhole tools such as sensors, logging tools, drilling motors, location sensors and other equipment are limited physically and are prohibitively expensive to use in land based and offshore drilling operations. What is needed is a cost effective and efficient way to transmit high speed data to and from subsurface equipment.

BRIEF SUMMARY OF THE DISCLOSURE

The invention more particularly includes an electrically conductive well-bore fluid for data transmission between a computer on the surface and a tool located within the well-bore.

In one embodiment, an electrically conductive well-bore carrier fluid is provided that has a well-bore fluid with 0.001% w/v to 0.01% w/v carbon fiber. The carbon fiber is suspended in the well-bore fluid and is anisotropically oriented making the well-bore fluid electromagnetically conductive through said well-bore.

In another embodiment, the electrically conductive fluid is a drilling fluid made of a drilling fluid comprising 1-20% v/v aqueous mixture and 99-80% v/v hydrophobic fluid; with 0.001% w/v to 0.01% w/v carbon fiber. The carbon fiber is suspended in the drilling fluid and is anisotropically oriented, which allows the drilling fluid to transmit electromagnetic waves through the well-bore.

A method of producing hydrocarbons from a subterranean hydrocarbon reservoir is also provided where there is a well-bore in a hydrocarbon reservoir; an electrically conductive well-bore carrier fluid comprising 0.001% w/v to 0.01% w/v carbon fiber is injected into said well-bore; and data communications are transmitted via electromagnetic waves through said well-bore fluid. The carbon fiber is suspended in the well-bore fluid and is anisotropically oriented, such that the well-bore fluid transmits electromagnetic waves through the well-bore.

A method of drilling a well in an underground formation is also provided where an electrically conductive drilling fluid comprising an drilling mud comprising 1-20% v/v aqueous solution and 99-80% v/v hydrophobic fluid, and 0.001% w/v to 0.01% w/v carbon fiber, is injected into the well-bore during drilling. The carbon fiber is suspended in the drilling fluid and is anisotropically oriented allowing the drilling fluid to transmit electromagnetic waves through the well-bore; drilling a well in an underground formation; and transmitting one or more electronic signals through the drilling mud.

The electromagnetic waves may include radio frequency, analog signal, frequency modulated, amplitude modulated, phase modulated, digital modulation, pulse width modulated, or the like. The electromagnetic waves may be generated through a computer processor.

The carrier fluid provides real-time data transmission and communication between a computer processor on the surface and a tool in a well-bore. The carrier fluid may be hydrophobic, aqueous, or emulsion and the fluid may be a drilling, completion, logging, production, or workover fluid.

A well-bore carrier fluid system may include a computer, a transmitter, and/or receiver connected to a well bore fluid comprising carbon fibers. The transmitted signal may be boosted by one or more repeaters located within the well bore. A variety of tools may be controlled by signals transmitted through well bore fluid including sensors, motors, valves, repeaters, pumps, arms, rotors, and the like.

Tools which may be controlled, monitored, corrected, updated, charged, or otherwise used for data transmission, communication, and receiving include drilling tools, completion tools, logging tools, production tools, workover tools, and other downhole tools that may be used to assess or improve hydrocarbon production. Dynamic sensor may be contacted, monitored, adjusted, or queried including High-fidelity bending moments, weight-on-bit, torque, accelerometers for downhole accelerations, rpm and the like. Logging tools may likewise be contacted, monitored, adjusted, or queried including Gamma Ray, Resistivity for both phase and attenuation measurements for shallow and deep depths of investigation, Density, Neutron porosity, Sonic, Azimuthal Resistivity, Gamma, and Azimuthal Density, Formation Pressure Measurements. Sensors for both internal and external pressures, Directional and Inclinations sensors, both magnetic and gravity based, Temperature, position, rate, distance, and the like may also be contacted, monitored, adjusted, or queried. Additionally, because the rate of signal travel is known or can be calculated through the carrier fluid, distances may be accurately measured to various tools within the wellbore and they may be "pinged" periodically to assure that distance and position are correct within the well-bore. Completion, production, workover and other processes may be accurately assessed by contacting, monitoring, adjusting, or querying flow meters, temperature sensors, pressure sensors, densitometers, viscometers, NMR, and other downhole tools that heretofore have been inaccessible while downhole. This powerful new electrically conductive carrier fluid allows operators to determine if a test is accurate and complete in real time, without having to retrieve the tool A crossover device may be used to connect to tools that do not have an integrated transmitter, receiver, or computer processor. The crossover device may be connected to one or more tools that can be controlled through the conductive carrier fluid. The crossover device may be tool specific or generic dependent upon the ability to communicate with various devices.

Examples and various features and advantageous details thereof are explained more fully with reference to the exemplary, and therefore non-limiting, examples illustrated in the accompanying drawings and detailed in the following description. Descriptions of known starting materials and processes can be omitted so as not to unnecessarily obscure the disclosure in detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

Additionally, any examples or illustrations given herein are not to be regarded in any way as restrictions on, limits to, or express definitions of, any term or terms with which they are utilized. Instead these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or cannot be given therewith or elsewhere in the specification and all such examples are intended to be included within the scope of that term or terms. Language designating such non-limiting examples and illustrations includes, but is not limited to: "for example," "for instance," "e.g.," "In some examples," and the like.

Although the terms first, second, etc. can be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present inventive concept.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

There are certain advantages to the "carrier fluid" in that additional applications and technologies can be applied. In this case the supporting technology is the ability to transmit certain energy protocols such as direct or modulated A/C currents, pulse width modulation of D/C currents, and various modulation protocols of radio frequencies. These different forms of energy can be easily harvested for recharging various sensor battery systems. The technology behind this energy harvesting has been well established, proven and readily available in the marketplace. For example, Texas Instruments has no less than 20 different and specific microprocessors designed for a large variation of energy harvesting methods plus development kits for such projects.

Each repeater system, sensors and control modules with on-board rechargeable batteries could be charged. Providing maintenance of battery energy levels to assure continuous and uninterrupted real-time bi-directional communications throughout the well-bore operations without removing tools and equipment for battery replacements. This technology can be applied to drilling, completion, production, logging, and workover equipment by having a conductive carrier fluid in either the interior of the wellbore, in the outer casing, or in the annulus of a wellbore dependent upon the structure of a given well-bore.

Figure 3:
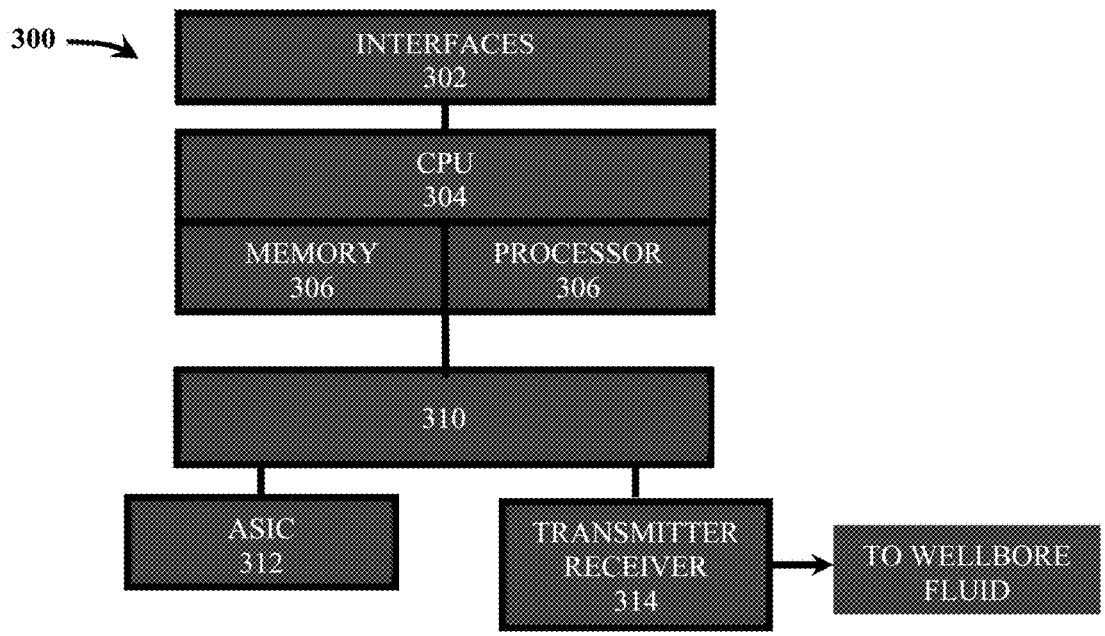
FIG. 3 illustrates an example device for transmitting and/or receiving data and communications through a well-bore carrier fluid.
Figure 4:
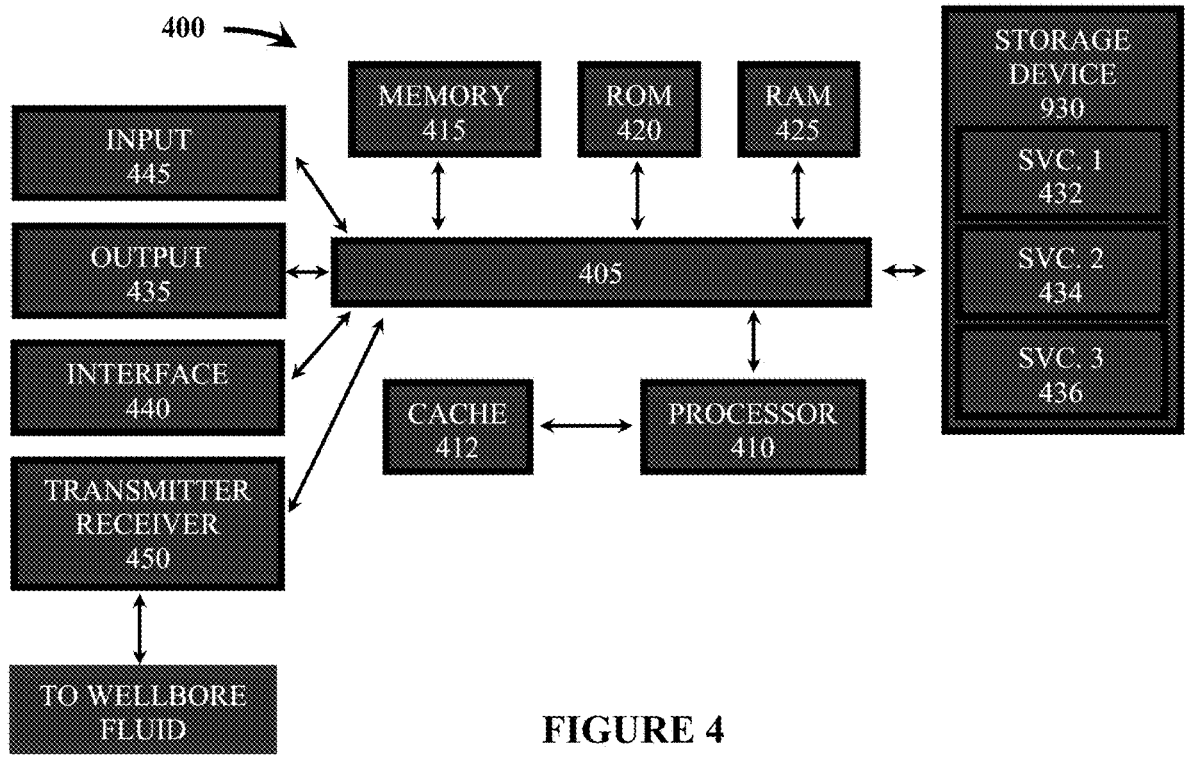
FIG. 4 illustrates a computing system architecture for transmitting and/or receiving data and communications through a well-bore carrier fluid.

Data transmission, data communication, and digital communication describe the transfer of data, a digital bitstream, or a digitized signal. A hardware device such as shown in FIGS. 3 & 4, may convert data into a format suitable for a transmission through the carrier fluid so that it can be transmitted from one processor to another. The hardware device modulates one or more carrier wave signals to encode digital information for transmission and demodulates signals to decode the transmitted information. The goal is to produce a signal that can be transmitted easily and decoded reliably to reproduce the original digital data after transmission through the carrier fluid. The hardware device can be used with almost any means of transmitting signals through the carrier fluid with electromagnetic modulation. A common type of transmission would be one that turns the digital data of a device into modulated electrical signal for transmission over carrier fluid and demodulated by another device at the receiver side to recover the digital data.

Using a "conductive carrier fluid" makes hi-fidelity data from downhole tools to surface "real-time." Conductive carrier fluids can achieve similar data transfer rates to wired drill pipe with dramatically reduced cost relative to wired pipe and significantly reduced TOTAL well cost. Additionally, conductive carrier fluid may communicate with one or more tools whereas wired pipe must be wired for each tool. Conductive carrier fluid allows transmission to mobile tools that may be pumped in and out of the wellbore, temperature sensors, flow meters, viscometers, orientation and tortuosity could be measured with one or more drop-in tools that are pumped through the wellbore and returned with the carrier fluid.

There are numerous advantages to a conductive well-bore carrier fluid.

Using a conductive carrier drilling mud with Real-Time Downhole and Surface data—The door to closed loop, automated drilling is opened. It is possible that we can get significantly greater data transfer rates (bandwidth) with similar reliability to mud-pulse systems. Via conductive additive to the drilling mud bi-directional communication to the BHA (near bit) is possible and has potential to provide superior data rates compared to mud-pulse technology.

Signal Generator to generate multiple waveforms/frequencies is connected via the conductive borehole fluid to control equipment.

The following examples of certain embodiments of the invention are given. Each example is provided by way of explanation of the invention, one of many embodiments of the invention, and the following examples should not be read to limit, or define, the scope of the invention.

Initial testing indicates that non-conductive drilling mud or other non-conductive fluid can be made conductive through the addition of carbon fibers.

TABLE 1

Comparative resistivity of fluids

|  | Resistivity (Ohmmeters) | Resistivity with 70 oz Carbon Fiber per Barrel (Ohmmeters) |
| --- | --- | --- |
| Water | 1.457 MM | 58.3 |
| Corn Oil | ∞ | 87.6 |
| Drilling Mud | ∞ | 87.6 |
| Emulsion | TBD | TBD |

Many well fluids can be made conductive or more conductive with carbon fiber including aqueous fluids, hydrophobic fluids, and emulsions. It was unexpected that emulsions actually increased conductivity above that of either aqueous fluids or hydrophobic fluids. Well fluids include well bore fluids used during drilling, wash fluids used for cementing, cement slurries themselves, completion fluids, fracturing fluids, workover fluids, and production well fluids. Any fluids pumped downhole during drilling, completion, or production may be made conductive with the addition of a small amount of carbon fiber.

In one embodiment an emulsion is created comprising 1-20% v/v aqueous solution and 80-99% v/v hydrophobic fluid. The hydrophobic solution is mixed with a small amount of carbon fibers. Typically, carbon fiber concentrations may range from 0.001% w/v to 0.01% w/v. In another embodiment, carbon fibers are suspended in aqueous solution and mixed 1:5 with hydrophobic fluid. An emulsion with low concentrations of carbon fibers provides an excellent conduit for rig to bit communications in real time. Often well bore emulsions are hydrophobic and run from 1-49% aqueous solution with 51-99% hydrophobic solutions.

In another embodiment, an aqueous treatment may be used such as fracturing the well during completion. In this case a small amount of carbon fiber may be added to the aqueous solution to provide a conductive fluid. This would allow communication with a variety of equipment including repeaters, sensors, switches, motors, valves, and the like.

In another embodiment a system for communicating in real-time from rig to bit is provided. This system includes a transmitter and/or receiver connected to a well bore fluid comprising carbon fiber. The transmitter transmits a signal to the well bore fluid which conducts the signal to equipment in the well bore. The signal may optionally be boosted by one or more repeaters located within the well bore. Tools that may be controlled by signals transmitted through well bore fluid include motors, actuated valves, sensors, monitors, logging tools, cutters, igniters, monitors, repeaters, and the like. Inversely, a receiver may receive communications and data from various well tools including sensors, motors, valves, repeaters, and the like. Any tool or equipment that previously required either a direct wire connector, mud pulse communication, and/or drop in devices, could now be controlled through the conductive drilling mud.

In one embodiment, repeaters are used to transmit signals over longer distances. Repeaters may contain both a receiver and a transmitter for relaying signals. Repeaters may also contain sensors for determining flow rate, temperature, pressure, and/or rotation of the drill string at that location. Repeaters may be fixed to or within the well casing, drill string, tubing, subsurface tool, or other well structure. Repeaters may also be dispersed in the fluid at intervals.

Figure 1:
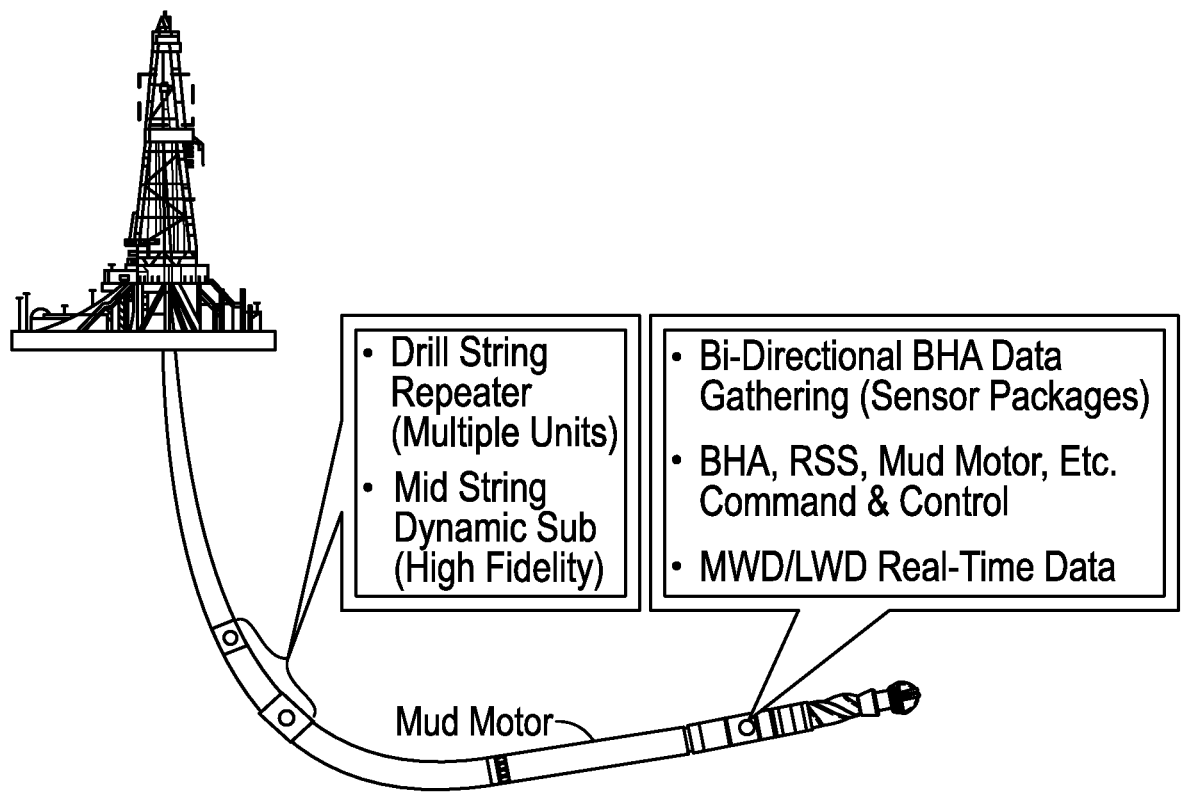
FIG. 1 is an overview of a drilling rig with rig-to-bit communications.
Figure 2:
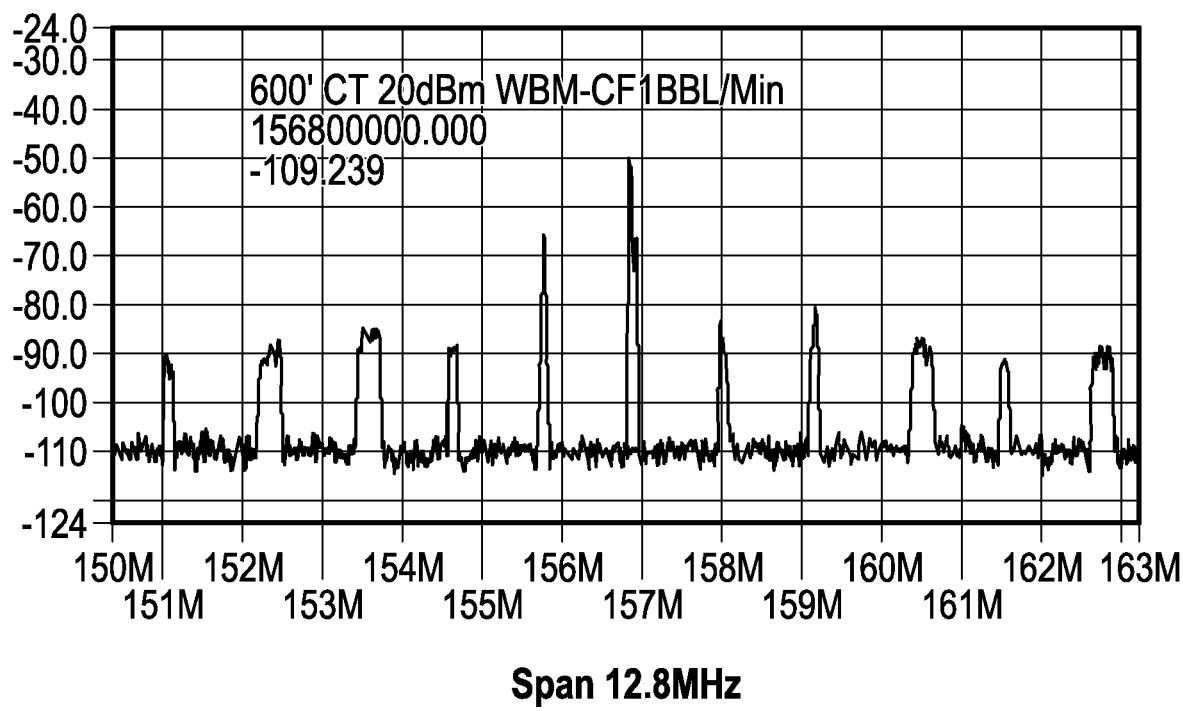
FIG. 2 shows electromagnetic signal strength through a conductive fluid from 150-160 megahertz.

FIG. 2 demonstrates that signals can be transmitted through a carrier fluid. Approximately 1 ppb of carbon fiber was mixed with 10 barrels of aqueous solution. The solution was added to a grounded steel pipe and a current transmitted through the carrier fluid in the steel pipe. The signal generated was between 150 and 160 megahertz indicating that standard computer communications could be transmitted through the carrier fluid. As is shown in the graph, variations in the transmission are clearly discernable. Similar communications such as those transmitted through a broadband modem could be transmitted through the carrier fluid.

FIG. 3 illustrates an example device 300 suitable for implementing one or more aspects of the present disclosure. Device 300 includes a central processing unit (CPU) 304, interfaces 302, and a connection 310 (e.g., a PCI bus). When acting under the control of appropriate software and/or firmware, the CPU 304 is responsible for executing packet management, error detection, and/or routing functions. The CPU 304 preferably accomplishes all these functions under the control of software including an operating system and any appropriate applications software. CPU 304 may include one or more processors 308, such as a processor from the INTEL X86 family of microprocessors. In some cases, processor 308 can be specially designed hardware for controlling the operations of device 300. In some cases, a memory 306 (e.g., non-volatile RAM, ROM, etc.) also forms part of CPU 304. However, there are many different ways in which memory could be coupled to the system.

The interfaces 302 are typically provided as modular interface cards (sometimes referred to as "line cards"). Generally, they control the sending and receiving of data packets and sometimes support other peripherals used with the device 300. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master microprocessor (e.g. CPU 304) to efficiently perform routing computations, network diagnostics, security functions, etc.

Although the system shown in FIG. 3 is one specific device according to some examples of the present technologies, it is by no means the only network device architecture on which the present technologies can be implemented. For example, an architecture having a single processor that handles communications as well as routing computations, etc., is often used. Further, other types of interfaces and media could also be used with the device 300.

Regardless of the device's configuration, it may employ one or more memories or memory modules (including memory 306) configured to store program instructions for the general-purpose operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 306 could also hold various software containers and virtualized execution environments and data.

The device 300 can also include an application-specific integrated circuit (ASIC) 312, which can be configured to perform routing and/or switching operations. The ASIC 312 can communicate with other components in the device 300 via the connection 310, to exchange data and signals and coordinate various types of operations by the device 300, such as routing, switching, and/or data storage operations, for example.

FIG. 4 illustrates a computing system architecture 400 wherein the components of the system are in electrical communication with each other using a connection 405, such as a bus. Exemplary system 400 includes a processing unit (CPU or processor) 410 and a system connection 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware or software service, such as service 1 432, service 2 434, and service 3 436 stored in storage device 430, configured to control the processor 410 as well as a special-purpose processor where software instructions are incorporated into the actual processor design. The processor 410 may be a completely self-contained computing system, containing multiple cores or processors, a bus, memory controller, cache, etc. A multi-core processor may be symmetric or asymmetric.

To enable user interaction with the computing system architecture 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing system architecture 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include services 432, 434, 436 for controlling the processor 410. Other hardware or software modules are contemplated. The storage device 430 can be connected to the system connection 405. In one aspect, a hardware module that performs a particular function can include the software component stored in a computer-readable medium in connection with the necessary hardware components, such as the processor 410, connection 405, output device 435, and so forth, to carry out the function.

While preferred examples of the present inventive concept have been shown and described herein, it will be obvious to those skilled in the art that such examples are provided by way of example only. Numerous variations, changes, and substitutions will now occur to those skilled in the art without departing from the disclosure. It should be understood that various alternatives to the examples of the disclosure described herein can be employed in practicing the disclosure. It is intended that the following claims define the scope of the disclosure and that methods and structures within the scope of these claims and their equivalents be covered thereby.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

ACKNOWLEDGEMENTS

The Inventors would like to acknowledge J. G. Samuell, Herb Schwann, and Tim Au for their contribution and guidance while developing this invention. We look forward to many additional innovations and developing these tools to provide real-time downhole communication.

REFERENCES

All of the references cited herein are expressly incorporated by reference. The discussion of any reference is not an admission that it is prior art to the present invention, especially any reference that may have a publication date after the priority date of this application. Incorporated references are listed again here for convenience:
1. U.S. Pat. No. 2,696,468, Fischer, "Conductive oil-base drilling fluids."
2. U.S. Pat. No. 6,006,831, Schlemmer & Shulz, "Electrical well logging fluid and method of using same."
3. U.S. Pat. No. 6,770,603, Sawdon, et al., "Electrically conductive non-aqueous well-bore fluids."
4. U.S. Pat. No. 7,112,557, Thaemlitz, "Electrically conductive oil-based mud."
5. U.S. Pat. No. 7,244,694, Fu, et al., "Viscoelastic fluids containing nanotubes for oilfield uses."
6. U.S. Pat. No. 8,183,180, Tour, et al., "Graphene Compositions and Drilling Fluids Derived Therefrom."
7. U.S. Pat. No. 8,469,118, Passade-Boupat, et al., "Drilling Fluid Containing Carbon Nanotubes."
8. U.S. Pat. No. 8,763,695, Van Zanten, "Electrically conductive oil-based drilling fluids."
9. US20110111988, Ionescu and Fatseyeu, "Electrically Conductive Oil Base Drilling Fluids Containing Carbon Nanotubes."
10. US20150368539, Tour, et al. "Carbonaceous Nanoparticles as Conductivity Enhancement Additives to Water-in-Oil Emulsions, Oil-in-Water Emulsions and Oil-Based Well-bore Fluids."
11. US20150284619, Price, et al., "Electrically Conductive Well-bore Fluids and Methods of Use."
12. WO2017192642, Price, et al., "Conductive Well-bore Fluids and/or Filtercakes, Well-bore Fluids for Producing the Same, and Methods of Use thereof."
13. WO2017192646, Price, et al., "Methods of Drilling with Resistivity Tools."
14. WO2017192652, Price, et al., "Methods of Drilling with Resistivity Tools."
15. WO2017192656, Price, et al., "Methods of Formulating Conductive Well-bore Fluids."

The invention claimed is:
1. An electrically conductive drilling fluid comprising:
a) a drilling fluid comprising 1-20% v/v aqueous mixture and 99-80% v/v hydrophobic fluid; and
b) 0.001% w/v to 0.01% w/v carbon fiber
wherein said carbon fiber is suspended in said drilling fluid, said carbon fiber is anisotropically oriented, and said drilling fluid transmits electromagnetic waves through said well-bore to provide a conductive drilling fluid,
wherein said conductive drilling fluid provides real-time data transmission and communication between a computer processor on the surface and a tool in a well-bore.
2. The electrically conductive drilling fluid of claim 1 wherein said electromagnetic waves include radio frequency, analog signal, frequency modulated, amplitude modulated, phase modulated, digital modulation, pulse width modulated, or the like.
3. The electrically conductive drilling fluid of claim 1 wherein said electromagnetic waves are generated through a computer processor.
4. The electrically conductive drilling fluid of claim 1 wherein said electrically conductive well-bore carrier fluid is a hydrophobic, aqueous, or emulsion and said drilling fluid is a drilling mud, cement slurry, wash fluid, or other drilling fluid.
5. A method of drilling a well in an underground formation comprising:
injecting an electrically conductive drilling fluid comprising:
a) a drilling fluid comprising 1-20% v/v aqueous solution and 99-80% v/v hydrophobic fluid, and
b) 0.001% w/v to 0.01% w/v carbon fiber,
wherein said carbon fiber is suspended in said drilling fluid, said carbon fiber is anisotropically oriented, and said drilling fluid transmits electromagnetic waves through said well-bore to provide a conductive drilling fluid,
wherein said conductive drilling fluid provides real-time data transmission and communication between a computer processor on the surface and a tool in a well-bore;
drilling a well in an underground formation; and
transmitting one or more electronic signals through said conductive drilling fluid.
6. The method of claim 5 wherein said electromagnetic waves include radio frequency, analog signal, frequency modulated, amplitude modulated, phase modulated, digital modulation, pulse width modulated, or the like.
7. The electrically conductive drilling fluid of claim 5 wherein said electromagnetic waves are generated through a computer processor.
8. The electrically conductive drilling fluid of claim 5 wherein said electrically conductive well-bore carrier fluid is a hydrophobic, aqueous, or emulsion and said drilling fluid is a drilling mud, cement slurry, wash fluid, or other drilling fluid.

* * * * *